US007686911B2

(12) United States Patent
Mann

(10) Patent No.: US 7,686,911 B2
(45) Date of Patent: Mar. 30, 2010

(54) PROCESS FOR MAKING LAMINATED AND CURVED PANELS

(76) Inventor: Robert W. Mann, HCR-3, P.O. Box 953, Tucson, AZ (US) 85739

( * ) Notice: Subject to any disclaimer, the term of this patent is extended or adjusted under 35 U.S.C. 154(b) by 727 days.

(21) Appl. No.: 11/386,245

(22) Filed: Mar. 21, 2006

(65) Prior Publication Data

US 2007/0221314 A1 Sep. 27, 2007

(51) Int. Cl.
*B32B 38/04* (2006.01)

(52) U.S. Cl. ........................ 156/266; 156/250; 156/256; 156/264; 156/303.1; 156/245

(58) Field of Classification Search ................. 156/242, 156/245, 250, 303.1, 500, 506, 507, 508, 156/581
See application file for complete search history.

(56) References Cited

U.S. PATENT DOCUMENTS 4,931,124 A * 6/1990 Baum ........................ 156/245
6,639,135 B1 * 10/2003 Lucas ......................... 84/291
2003/0196744 A1 10/2003 Sicola

* cited by examiner

*Primary Examiner*—Mark A Osele
*Assistant Examiner*—Christopher C Caillouet
(74) *Attorney, Agent, or Firm*—Gavin J. Milczarek-Desai; Quarles & Brady LLP

(57) ABSTRACT

A method for making curved panels including the steps cutting curved subunits to the appropriate size required to form the curved panel, applying adhesive to and assembling the plurality of curved subunits into a predetermined a unitary curved panel, and clamping the curved panel to a mold conforming in shape to curved panel. The mold and clamping provide for a flush curved surface upon bonding of the adhesive.

5 Claims, 2 Drawing Sheets fig. 1
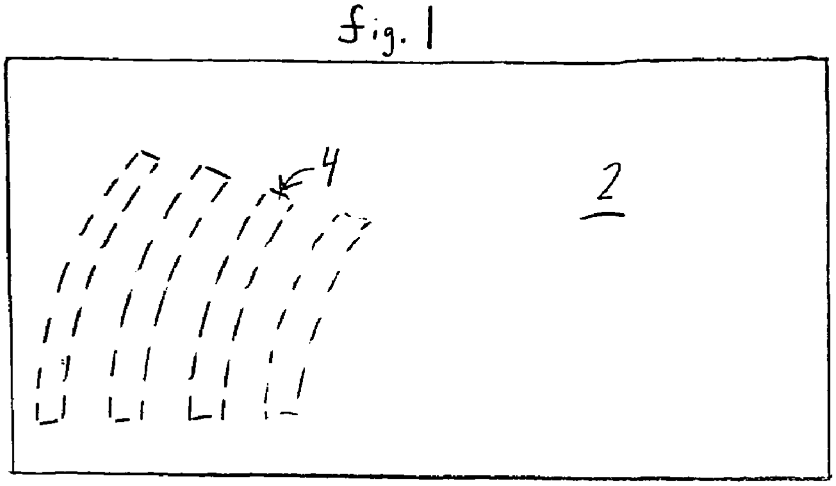
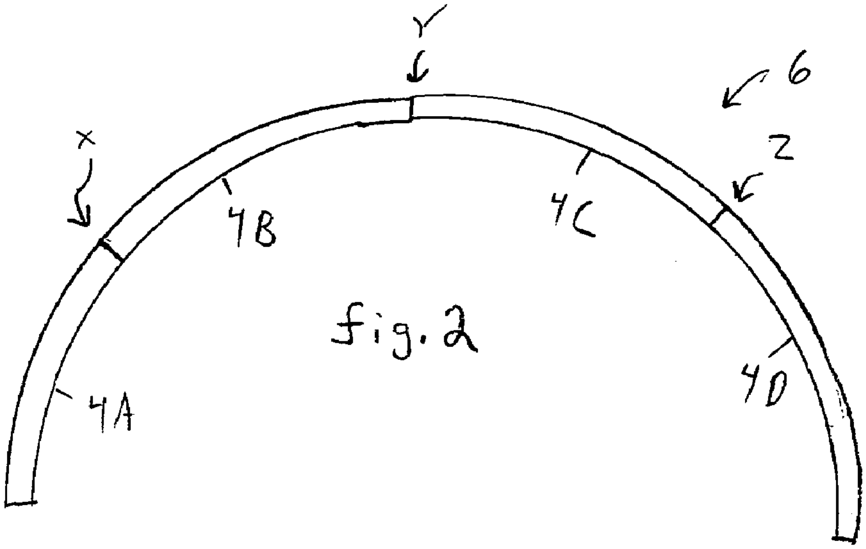
fig. 2
fig. 3
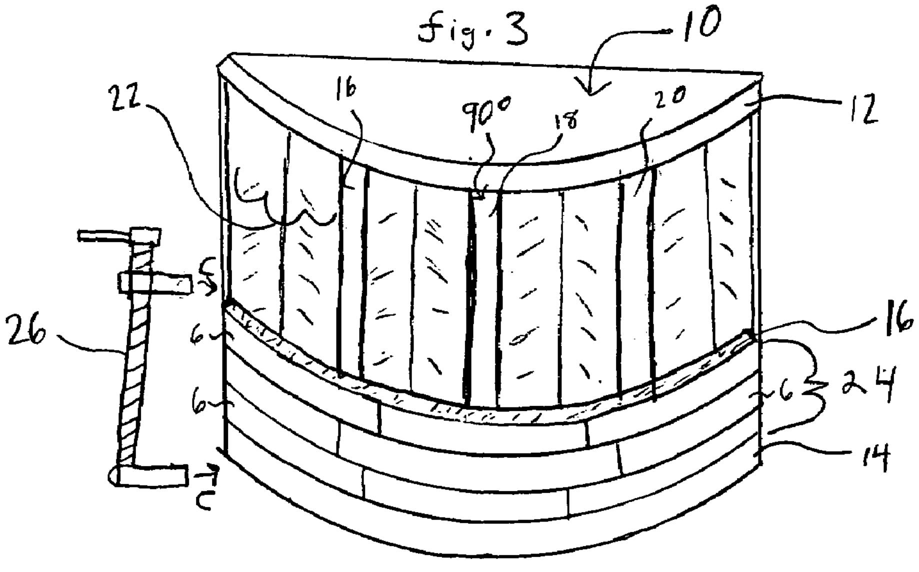

PROCESS FOR MAKING LAMINATED AND CURVED PANELS

BACKGROUND OF THE INVENTION

1. Field of the Invention

The invention relates generally to lamination methods and more particularly to lamination apparatus and methods that are especially useful to create curved panels from materials such as wood.

2. Description of the Related Art

Furniture and functional accessories, such as "grandfather-type" clocks, are often embellished with curved panels. These panels may be inset, raised, or flat, depending on the appearance desired by the furniture designer. In any case, the formation of a curved panel often is a separate process from the manufacture of the rest of the furniture item and is carried out differently by individual furniture makers. Although general techniques are shared and well known in the industry, each maker develops personal tricks of the trade that are generally kept confidential.

Inasmuch as all curved panels are formed by bending a material, or by forming a curve from the assembly of smaller subunits according to some design configuration, the objective is the same for all makers. Yet the method by which the resulting curved panel is formed affects the curved panel's durability, strength and, ultimately, its appearance. Therefore, the process of making curved panels is very important toward the ultimate value of the crafted item, even though at first glance the initial results may seem indistinguishable.

In a typical lamination procedure, subunits (e.g., slats or ribs) must be cut to size according to a pattern and then fitted together to form the panel. Unless otherwise designed, the fit must be such that no fissures are left between subunits. Moreover, the assembly of the subunits must result in a panel of exact outer dimensions to fit within the intended space or overall body structure on the furniture or accessory. Finally, the curved panel must conform to a predetermined curved shape that resists warping or cracking. Therefore, the process of first cutting each subunit (for example, from lumber) in the required dimension and then connecting all subunits to form a curved panel such that each subunit is properly bonded and aligned with each other is difficult and time consuming.

Accordingly, there is a need for an improved method for assembling subunits to form a curved panel.

SUMMARY OF THE INVENTION

The invention relates in general to a lamination process, and molds relating thereto, for holding assembled subunits in place to form a curved panel.

Therefore, according to this and other objectives, the present invention includes cutting each subunit (e.g., a rib, slat, or other individual piece of material intended to form a laminated, curved panel) to the appropriate size and shape required to form the panel (for example, see FIG. 1). The subunits are placed face down on a flat support, an adhesive is applied to a joining or interior end of each subunit, and the subunits are assembled into an arc according to the design of the intended panel. Layers of adhesive are then progressively applied to the top surface of each arc and the arcs are laminated to form a curved panel. The curved panel is clamped to a mold conforming in shape to the desired curve while the adhesive is allowed to set.

In one aspect of the invention, a curved mold and clamps are utilized to keep the assembled and adhered panel flush such that all subunits are substantially aligned in a vertical plane relative to each other.

Another aspect of the invention relates to a general method for building a curved and laminated panel, including the steps of: (1) applying adhesive to a first surface of said plurality of curved subunits; (2) assembling the plurality of curved subunits into a predetermined configuration to form a unitary curved structure; and (3) clamping the curved panel to a mold conforming in shape to the panel.

Various other purposes and advantages of the invention will become clear from its description in the specification that follows. Therefore, to the accomplishment of the objectives described above, this invention includes the features hereinafter fully described in the detailed description of the preferred embodiments, and particularly pointed out in the claims. However, such description discloses only some of the various ways in which the invention may be practiced.

BRIEF DESCRIPTION OF THE DRAWINGS

FIG. 1 is a top plan view showing subunits of the invention as they would be cut from a larger piece of material.

FIG. 2 illustrates in elevational view a single arc of subunits that have been assembled along an interior end.

FIG. 3 is a front perspective view of the apparatus of the invention.

DETAILED DESCRIPTION OF THE PREFERRED EMBODIMENTS

Figure 4:
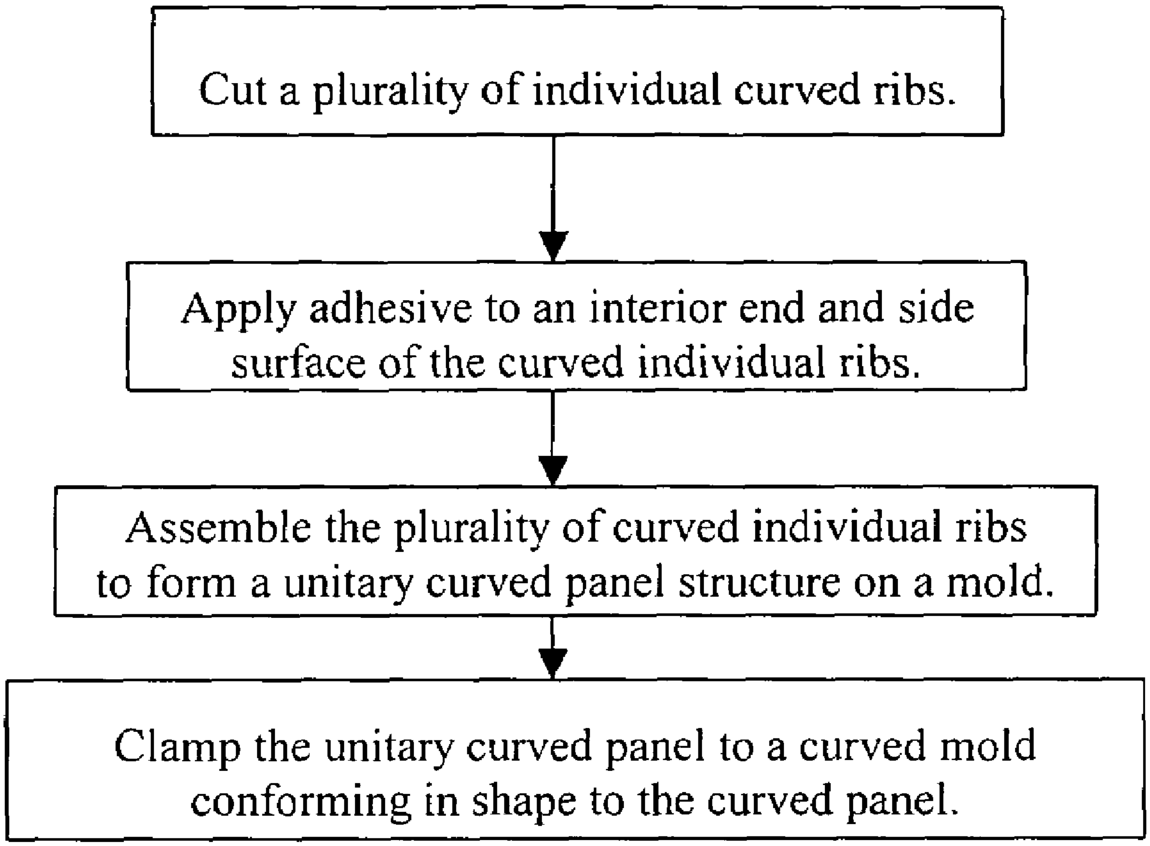
FIG. 4 is a flow diagram illustrating in outline preferred method steps of the invention.

The principal inventive aspect of this disclosure lies in the idea creating a curved panel of material out of the lamination of smaller subunits. The invention further lies in the binding of the subunits of the curved panel both to each other and to the curved mold while bonding of the adhesive occurs. The binding occurs through clamping means, which ensures strong adhesion of each subunit to the next. Moreover, clamping the subunits to the curved mold ensure that the surface of the resulting unitary curved panel is bonded flush, i.e., each subunit is flush with the mold, and, accordingly, is in smooth alignment with every other subunit. As a result, a strongly bonded curved panel with smooth surfaces is formed.

Referring to the drawings, wherein like parts are designated throughout with like numerals and symbols, FIG. 1 illustrates a starting material 2 from which subunits 4 are to be cut. Depending on the nature of the material, cutting may occur through a variety of methods, including sawing, punching, or laser cutting. The shape into which the subunits 4 are cut is determined depending on the ultimate shape of the desired curved panel. As an example, the subunits 4 are cut so as to form the 180 degree arc shape of FIG. 2 when assembled.

FIG. 2 illustrates a single arc 6 of subunits 4 that has been formed by adhering the subunits 4A-4D end-to-end. In the context of the invention, an "interior end" of a subunit is that end which adjoins and is adhered to the end of another subunit. Thus, an interior end of subunit 4A is adhered to interior end of 4B at arrow X; the other interior end of subunit 4B is adhered to an interior end of subunit 4C at arrow Y; and the interior end of subunit 4D is adhered to the other end of subunit 4C. Both subunits 4A and 4D have one "exterior" (i.e., not adhered) end. Preferably, a wood glue or latex glue is used as the adhesive in wood applications. Application of the adhesive may be by spraying, brushing, rolling or any other method used to deposit a film of adhesive on a surface.

Turning to FIG. 3, a curved mold 10 is shown. The mold 10 preferably includes a top piece 12 and an bottom piece 14 between which fins 16, 18, and 20 are disposed. Again preferably, the fins 16, 18 and 20 are disposed at regular intervals along the face of mold 10, with at least one fin (18) in the ninety-degree position and with a recess 22 between each fin.

The next step in formed a curved panel on (or for subsequent placement on) mold 10 includes applying a layer of adhesive to the top surface 16 (the surface seen in FIG. 3) of each arc 6 and then assembling each arc 6 to form a unitary curved panel 24 as shown. Obviously, the top arc does not need adhesive unless something is to be bonded thereto. While the adhesive has not yet set, the panel 24 is clamped to the mold 10 such that the panel 24 is flush against the mold (in this case flush against fins 16, 18 and 20). The clamp 26 is attached to the bottom 14 of the mold and to the top surface of the panel 24 as shown by arrows C, and the adhesive is allowed to set. By clamping the panel flush to the mold, the subunits will remain aligned such that the inner and outer surface of the panel is substantially smooth upon bonding of the adhesive. After the clamps are removed, the surface of the panel 24 may be sanded to remove any extra adhesive.

As shown in the flow diagram of FIG. 4, a preferred method for making a curved laminated panel includes the steps of cutting a plurality of curved subunits; applying adhesive to a first and second surface of the plurality of curved subunits; assembling the plurality of curved subunits into a predetermined unitary curved panel; and clamping the curved panel to a mold conforming in shape to the curved panel. While the preferred material from which the curved panel is formed would be wood in many furniture making contexts, other materials, such as polyurethane or metal, may be used as well. Alternatively, the steps of assembling and clamping may be practiced by placing one layer of the curved panel upon the mold at a time and clamping a second layer flush against the first layer and the mold until the adhesive sets. This process is then repeated with subsequent layers until the desired curved panel is formed, adding one layer at a time.

Because the a curved mold is adapted to engage in flush alignment a plurality of subunits that have been adhered together to form the unitary curved panel, a very strong yet smooth and precisely made curved panel results. Advantageously, the laminated curved panels of the invention are capable of holding in place individual subunits and so resist warping, which is unavoidable for materials such as solid woods with changes in moisture and temperature. In addition, laminated panels of the invention resist warping and deformation under varying weather and aging conditions. Thus, the curved panels resulting from the process of the invention are very stable and durable, and are suitable for very large applications.

Various changes in the details and components that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A method for making a curved laminated panel, comprising the following steps:

cutting a plurality of curved subunits;

then, forming a plurality of arcs by adhering an end of each of said plurality of curved subunits to an end of at least one other of the plurality of curved subunits;

then, assembling said plurality of arcs by applying an adhesive to a top surface of one of said arcs and placing an additional of said arcs in contact therewith, thereby forming said plurality of arcs into at least a portion of a predetermined unitary curved panel and resulting in said plurality of curved subunits being adhered to each other by at least one end and at least one other surface; and clamping said curved panel to a mold conforming in shape to said unitary curved panel.

2. The method recited in claim 1, wherein said step of clamping further comprises clamping said panel flush against said mold such that an inner and outer surface of the panel is substantially smooth.

3. The method recited in claim 1, further comprising the step of sanding said curved panel after said subunits have bonded together to form said unitary curved panel.

4. A panel made according to the method of claim 1.

5. The method of claim 1, wherein said plurality of arcs forming the unitary curved panel are aligned such that a seam defined by adhering the end of each of said plurality of curved subunits to the end of at least one other of the plurality of curved subunits is offset from the seam of an adjacent arc.

* * * * *